June 4, 1963

N. D. FROOT 3,092,107

HYPODERMIC INJECTION DEVICE

Filed Feb. 23, 1960

INVENTOR.
NATHAN D. FROOT

BY
OSTROLENK, FABER, GERB & SOFFEN
ATTORNEYS

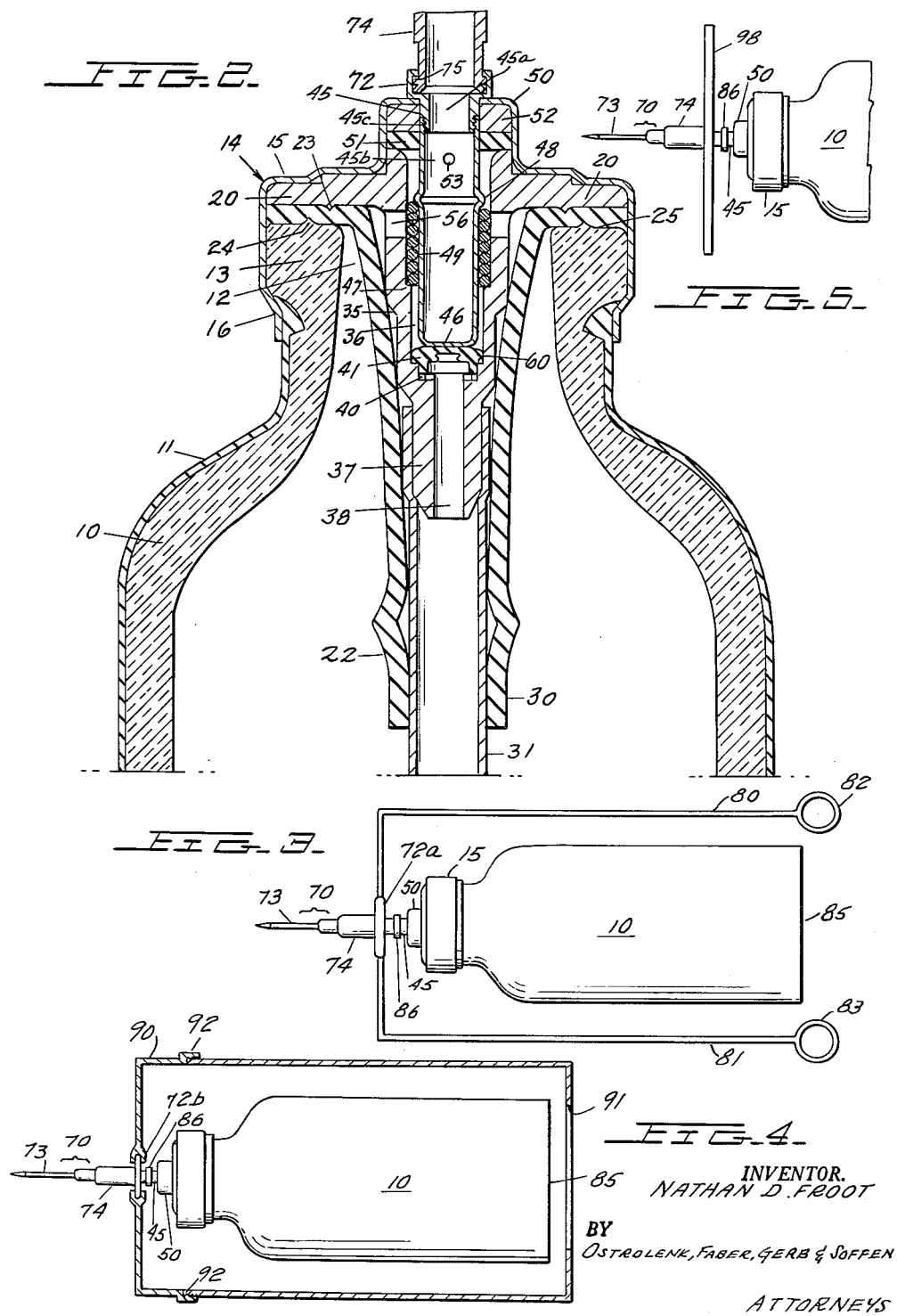

United States Patent Office 3,092,107
Patented June 4, 1963

3,092,107
HYPODERMIC INJECTION DEVICE
Nathan D. Froot, 119 Shirley Lane, White Plains, N.Y.
Filed Feb. 23, 1960, Ser. No. 10,173
2 Claims. (Cl. 128—216)

My present invention relates to hypodermic injection devices and more particularly to a hypodermic injector which may be used to deliver repeated predetermined doses of the contained fluid to human beings, animals, plants and objects and which may, when desired, be automatic in operation.

More specifically, my invention relates to a hypodermic device in which the hollow needle is connected to a metering valve of a pressurized vessel in which the needle may be used, under certain conditions, to operate the valve.

My invention further contemplates that the needle be connected to and capable where desired of operating a metering device on a pressurized vessel, wherein back pressure on the needle itself in the course of insertion of the needle will cause a discharge through the needle of a metered quantity of injectable fluid thereby enabling repeated insertions of the needle to cause repeated injections of metered quantities of fluid. The quantity of fluid to be discharged would be determined by the construction and dimensions of the metering valve and would be appropriate for the specific application intended.

The primary object of my invention, therefore, is the provision of a hypodermic injecting device in which a pressurized vessel is utilized for the fluid and propellant and in which a metering valve for the pressurized vessel is directly connected to the needle so that back pressure on the needle may either directly or indirectly operate a metering valve. Basically, my invention consists of a hypodermic needle, an aerosol container and a metering device.

The foregoing and many other objects of my invention will become more apparent in the following description and drawings in which:

FIGURE 2 is a cross-sectional view corresponding to that of FIGURE 1 showing the actuation of the valve as a result of back pressure on the needle.

FIGURE 3 is a side view showing a modified operating structure.

FIGURE 4 is a side view partly in cross-section showing another modified operating structure.

FIGURE 5 is a side view of another modified operating structure.

Figure 1:
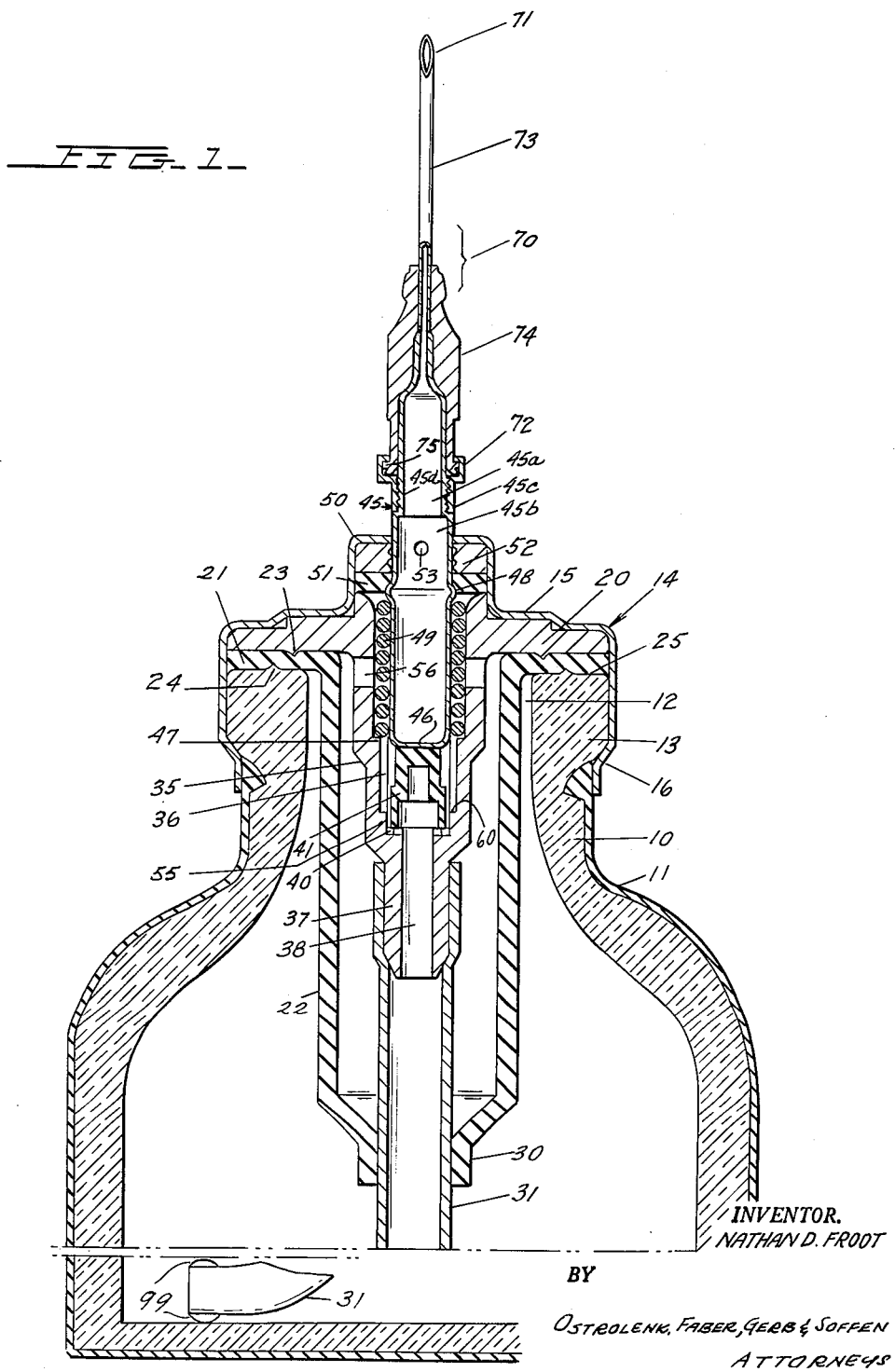
FIGURE 1 is a partial longitudinal cross-section through a pressurized vessel showing the metering valve and the tubular needle attached thereto.

Referring first to FIGURE 1, there is here shown a pressure vessel 10 which may be of the type known as an aerosol dispenser. Such a vessel, as is well known, contains a fluid to be dispensed and a quantity of propellant which will drive the fluid out of any opening created in the valve. The vessel 10 in this case should be an aerosol container of either metal, glass or plastic provided that its material is non-contaminating and not reactive with the contained fluid. If glass is used it may additionally be covered or protected, where desired, by a protective outer material 11 which will strengthen the vessel to resist internal pressures and prevent damage to the vessel from the exterior. Such coated glass aerosol containers are well-known.

For the purpose of illustrating my present invention it may be desirable that the vessel 10 be transparent or translucent so that the quantity of material remaining in the vessel may be known. Hence, where a reinforcing outer container or wrapping 11 is used, it also should be transparent if possible or at least translucent.

The pressure vessel 10 is provided at its opening 12 with a shoulder 13 to which is secured the entire valve assembly 14. The valve assembly 14 comprises a housing 15 which is pressed down on the shoulder 13, the housing having an annular flange 16 which is spun under the shoulder 13. A cover piece 20, retained with the housing 15, is pressed down on an annular flange 21 of the flexible sac 22 of the metering valve assembly 14. Appropriate annular serrations 23, 24 in the cover piece 20 and the pressure vessel surface 25 ensure a perfect seal at the flanges 21. The sac size in any particular application of my device is determined by the quantity of fluid to be dispensed on each injection. The gas used may be miscible or immiscible with the fluid and may consist of various propellants as desired including nitrogen, fluorinated hydrocarbons, propane, butane and others. In this case I have chosen to illustrate a form utilizing an immiscible propellant.

The lower neck 30 of the sac 22 is fit flush against the dip tube 31 which extends to near the bottom of the vessel 10.

In this form of aerosol device the propellant in the head space above the fluid will force the fluid up through the dip tube 31 to fill the metering chamber 22. Also, a metering valve may be used in which the metering chamber operates on a known diaphragm or piston basis.

The FIGURE 1 disclosure represents but one of the many types of metering valves which may be used.

The metering device, although shown on the interior of the container, may also, obviously be an exterior unit. It is here utilized to show one type of metering member by way of example only.

The sac size may, of course, be varied to accommodate the predetermined desired dosage.

The cover piece 20 is also provided with an inwardly directed auxiliary valve assembly 35 which provides a control valve chamber 36 and an extending neck 37 having a longitudinally tubular opening 38 communicating with the dip tube 31. The upper end of the dip tube 31 is secured to the neck 37. The interior of valve chamber 36 is provided with a valve seat 40 with respect to which a valve 41 of resilient material may operate.

A tubular nozzle 45 closed at its bottom end 46 extends adjacent the resilient valve 41. This nozzle may also be of transparent or translucent material to enable visual confirmation of delivery of the fluid in such forms as in FIGURES 1 and 2 where no housing may be used or where the housing or fingers of FIGURES 3 and 4 are transparent or where other surrounding elements are transparent. Nozzle 45 may be a compound member 45a, 45b, threaded together at 45c to provide ease of assembly. A compression spring 49 extends between an annular ledge 47 of the inwardly directed extension 35 and an annular ridge 48 on the nozzle tube 45. Nozzle tube 45 is vertically slidable in the upper section 50 of housing 15 with respect to the gasket 51 and packing 52. Exhaust nozzle 45 has an opening 53 in the side wall thereof; this opening in the normal extended position of spring 49 lies within the area of gasket 51 and packing 52 and is thereby effectively sealed. The pressure gas in the upper portion of the vessel drives the fluid up the dip tube 31 through tube 38 past the valve seat 40 and the valve 41 which is a loose fit in the tubular extension 55 just above the valve seat 40; then through chamber 36 past the spring 49 and through a plurality of openings 56 at the upper end of extension 35 and into the sac 22.

When the nozzle member 45 is depressed, compressing the spring 49, the lower end 46 of nozzle 45 compresses the resilient valve 41 against the valve ledge 60 effectively sealing the upper end of tube 38. As the upper end of tube 38 is thereby sealed, isolating the valve chamber 36 and the interior of sac 22 from the interior of the dip tube 31, the opening 53 in the tubular nozzle 45 descends below the gasket 51 into the valve chamber thereby connecting the interior of tubular nozzle 45 to the needle 70, hereinafter described, and through the needle opening 71 to a lower pressure area. A pressure differential is thereby created which causes the pressure gas in vessel 10 to collapse the sac 22, as shown by a comparison of FIGURES 1 and 2, and the quantity of fluid contained within the sac 22 and the valve chamber is thereby driven through opening 53 into the tubular nozzle 45 out through opening 71 of needle 70.

Only the quantity of fluid contained within the sac 22 and the valve chamber is thereby dispensed; on the occurrence of the downward movement of the nozzle 45, the remainder of the pressure vessel is sealed off. Hence, although the dip tube must be in the fluid during charging of the sac 22, during discharge of the metered quantity the dip tube need not necessarily be in the fluid.

In order to ensure that the dip tube will always be in the fluid, the tube may be made flexible and provided with a weight 99 at its end. Weight 99 will ensure that the end of the dip tube 31 will always be in the fluid irrespective of the position of the container.

Tube 45 beyond the top of housing section 50 is a rigid tube externally threaded at 45e (FIGURE 1) to receive the needle securing and support device 72. This device may be in any desired form but is here shown as a section of a breech-block arrangement known commercially as a Luer-Lok. Tube 45 is extended at 45d beyond the securing device 72 and shaped as shown in FIGURE 1 to form a liquid-tight seal inside the hub 74 and flush against the cannula 73 of needle assembly 70.

The needle 70 comprises a cannula 73 and the hub 74 which are integrated in a well known manner. The hub 74 is provided with a corresponding breech block arrangement 75 to mate with the breech block arrangement 72 of the exhaust tube 45 so that needles may readily be interchanged, that is after each injection if desired a sterilized needle may be substituted.

By this means it will be seen that with an appropriate arrangement of relative force exerted by the spring 49 and the resilient valve 41, that is with the spring 49 of sufficient strength, the valve assembly 15 will not be operated until after the needle point 71 has penetrated some distance beneath the skin; on operation of the valve only a predetermined metered quantity of fluid will be injected and no more. The relaxation of manual drive in pressure on the can or vessel 10 will result in automatic closing or restoration of the valve from the position of FIGURE 2 to the position of FIGURE 1 and the automatic refilling of sac 22 with another dose of the contained fluid; and the draw out pull will insure the restoration of the valve from the position of FIGURE 2 to the position of FIGURE 1.

My invention is directed to the integration of the needle, the metering valve and the pressurized container so that the back pressure created by insertion of the needle itself may be utilized to actuate the valve.

The structure as shown in FIGURES 1 and 2 is of particular value in injection of various pharmaceoutical preparations in animals where a large number of injections are to be performed in a short period of time, and is of particular value in the injection of fowl as well as other animals. In such cases of rapid and mass production injection, sterilization of the needle between the injections is not always practiced or deemed necessary. By the use of an appropriate needle may device would also have value in the application of mastitis treatments. Consequently, a single large container of the appropriate pharmaceutical with an appropriate metered injection volume and a well constructed needle may be used for many successive injections which are automatically introduced in predetermined amounts. My invention, therefore, also has great value for both humans and animals in mass injections and inoculations, health programs and during disaster periods.

In the case of injection of pharmaceutical fluids into humans or into animals where sterilization between injections is required, to fact that pressure equalizes on the discharge from the metered valve during injection, insures that no back pressure is created which will draw in fluid from the outside into the needle following the injection or during withdrawal of the needle. The withdrawal of the needle following the injection will, in fact, create a pressure reduction within the needle that would serve to draw out any fluid.

My invention is applicable also to applications outside the pharmaceutical field. Thus, it may be utilized for injection of fluids, such as preservatives, tenderizers, flavoring mediums, "liquid smoke" or other materials into meats and foods. It would also have value in the injection systemic insecticides or pharmaceuticals into plants.

Hence, at the end of each injection of a human or an animal, where sterilization is desired, the removal of a needle and substitution of a sterilized needle will insure complete sterilization between injections. In appropriate cases, the same needle may be continuously used by utilizing cold sterilization between injections.

Consequently, a succession of humans or animals may be injected with successive sterilized injections merely by substituting a sterilized needle between injections. The utilization of a transparent vessel will ensure that the physician or other person making the injection will be able to make certain that the appropriate operation has taken place; for instance, the transparency or translucency of element 45 will enable the operator to be certain that fluid is injected properly.

My invention as thus far described will operate automatically to discharge the fluid on the occurrence of predetermined back pressure from the needle to operate the valve.

In FIGURES 3 and 4 I have shown modifications of my invention in which the needle may be inserted without any operation of the valve and then the valve is actuated by actual movement of the container with respect to the needle. This assures that the operator can be satisfied with the depth and position of the needle before the metered dose is released; and, if necessary, the operator can remove and reposition the needle prior to injection.

In FIGURE 3 I have shown a construction in which the breech block sections 72a of the pressure vessel 10 is provided with a pair of angular extensions 80, 81 which may have finger grips 82, 83. The needle 73 is inserted by grasping extensions 80 and 81 or the finger grips 82 and 83. After insertion of the needle the operator's thumb presses the base 85 of the vessel 10 toward the needle thereby operating the valve and effecting the discharge.

If desired, a threaded joint 86 may be provided in that portion of the tube 45 which extends beyond the upper end 50 of housing 15 so that a new pressure vessel 10 may be substituted simply by unscrewing the vessel and its tube 45 at the threaded joint 86. The longitudinal tube 45 may be lengthened sufficiently, so that the tube may operate as described in connection with FIGURES 1 and 2.

Where no particular container holder or manual needle support is provided, the spring 49 can be arranged to be of such strength that it will not compress on initial insertion of the needle, but will compress, on imposition of increased pressure, following insertion of the needle.

It will be obvious that various trigger or handle arrangements may be substituted for the rods or arms 80 or 81; for instance, the rod 81 may be used alone with an appropriate grip such as a pistol grip to facilitate insertion of the needle with the thumb free to push the pressure vessel 10 toward the needle after insertion is completed. The threaded joint 86 is not essential where the gripping mechanism is intended to be discarded when the contents of the pressure vessel are used up.

In FIGURE 4 I have shown a modification of the structure of FIGURE 3 wherein section 72 of the original tube 45 is extended as at 72b to form a support for a complete outer container 90 having an opening 91 at the end opposite the needle. Here the complete outer container 90 furnishes a hand grip for insertion of the needle without operation of the valve. Thereafter, thumb pressure through opening 91 on the bottom 85 of pressure vessel 10 will result in operation of the valve in the manner described in connection with FIGURES 1 and 2. In this case there can be no accidental discharge or operation of the valve at any point, because the pressure vessel 10 is completely enclosed.

Here, too, the device may be made available as an integral unit wherein the container 90 and pressure vessel 10 may be discarded or returned after its contents are depleted, or an appropriate threaded joint 92 may be provided for the container and an appropriate threaded joint 86 may be provided for the tube 45 to permit interchange of pressure vessels 10.

In FIGURE 5, I have shown my novel device where the tube 45 is provided with the manually graspable disc 98 which may be held while the needle is inserted. After the needle is inserted, pressure on container 10 toward disc 98 will result in discharge of the dosage. This unit may be utilized in the manner described for use in connection with FIGURE 1 or may be used as described in connection with FIGURES 3 and 4.

By means herein described, therefore, my novel device may be used automatically to provide a metered injection on insertion of the hypodermic needle where mechanical back pressure on the needle will operate the valve. It may also be used to provide for simplified discharge of a metered quantity of contents through the needle after the needle has been inserted and the appropriateness of its location has been determined.

In the foregoing I have described my invention in connection with certain preferred illustrative embodiments thereof. Since many variations and modifications of my invention will now be obvious to those skilled in the art, I prefer to be bound not by the specific disclosures herein contained but only by the appended claims.

I claim:
1. A liquid dispenser comprising a rigid container adapted to hold a reservoir of liquid to be dispensed in incremental quantities and a propellant gas in direct contact with the liquid to force the liquid out of the container, said container having a discharge opening at one end, a dip tube disposed in the container between said discharge opening and the opposite end of the container, a collapsible sac on the interior of the container, said sac having an open end connected to the container about said discharge opening and another open end secured to the dip tube about the end thereof nearer said discharge opening, a first valve between the interior of the dip tube and the interior of the sac, a second valve between the interior of the sac and the exterior of the container, means forming a passageway between said valves, including said sac and a rigid member shiftable between a protracted and a retracted position on the container for simultaneously actuating said valves to close the first valve when the second valve is opened and to open the first valve when the second valve is closed, the second valve being closed when the rigid member is in its protracted position, resiliently yieldable means urging said member to its protracted position, and a hollow needle carried by said rigid member for comovement therewith, said needle extending outwardly from said member in the direction of its movement from the retracted to the protracted positions and having its hollow portion in communication with said passageway.

2. A liquid dispenser comprising a rigid container adapted to hold a reservoir of liquid to be dispensed in incremental quantities and a propellant gas in direct contact with the liquid to force the liquid out of the container, said container having a discharge opening at one end, a dip tube disposed in the container between said discharge opening and the opposite end of the container, liquid metering means connected to said discharge opening for dispensing predetermined incremental quantities of liquid through said opening, said metering means including an outlet passageway for the liquid and shiftable means on the exterior of the container for controlling the dispensing of the liquid through said passageway, said shiftable means being movable between a protracted position and a retracted position on the container, resiliently yieldable means urging the shiftable means to its protracted position, a hollow needle attached to and carried by said shiftable means, said needle extending outwardly from said shiftable means in the direction of its movement from the retracted to the protracted positions and having its hollow portion in communication with said passageway.

References Cited in the file of this patent

UNITED STATES PATENTS

| | | |
|---|---|---|
| 69,882 | Williams | Oct. 15, 1867 |
| 2,110,263 | Dziedzic | Mar. 8, 1938 |
| 2,337,347 | McPherson | Dec. 21, 1943 |
| 2,390,246 | Folkman | Dec. 4, 1945 |
| 2,457,859 | Austin | Jan. 4, 1949 |
| 2,856,103 | Ward | Oct. 14, 1958 |
| 2,856,235 | Ward | Oct. 14, 1958 |
| 2,861,571 | Sandhage et al. | Nov. 25, 1958 |
| 2,914,222 | Meshberg | Nov. 24, 1959 |
| 2,971,509 | Cohen | Feb. 14, 1961 |